UNITED STATES PATENT OFFICE.

GILBERT RIGG, OF PALMERTON, PENNSYLVANIA, ASSIGNOR TO THE NEW JERSEY ZINC COMPANY, OF NEW YORK, N. Y., A CORPORATION OF NEW JERSEY.

REMOVAL OF CADMIUM FROM ZINC ORES.

1,129,904.  Specification of Letters Patent.  Patented Mar. 2, 1915.

No Drawing.  Application filed December 3, 1914.  Serial No. 875,248.

*To all whom it may concern:*

Be it known that I, GILBERT RIGG, a subject of Great Britain, residing in Palmerton, county of Carbon, and State of Pennsylvania, have invented certain new and useful Improvements in Removal of Cadmium from Zinc Ores; and I do hereby declare the following to be a full, clear, and exact description of the invention, such as will enable others skilled in the art to which it appertains to make and use the same.

My invention relates to certain new and useful improvements in the removal of cadmium from zinc ores.

The invention is based upon the discovery that when a zinc ore containing cadmium oxid is lixiviated with water containing sulfuric acid in amount sufficient to convert the cadmium oxid present into cadmium sulfate, the sulfuric acid will have a selective action upon the cadmium. Moreover, even where the sulfuric acid radical is already combined with the zinc, as, for instance, in roasted zinc ore, the leaching of such ore with water I have found to be accompanied with the yielding up of its $SO_3$ to the cadmium oxid, with the formation of cadmium sulfate and its leaching out, as such, from the roasted ore.

In the practice of the invention I may take, for instance, a zinc ore roasted to a degree beyond a sulfatizing roast, that is to say, so as to leave in the roasted product not more than the usual amount of zinc sulfate incident to the roasting operation. By leaching the roasted zinc ore with water preferably at or near the boiling point, it will usually be found that the small amount of zinc sulfate usually present in the roasted ore will suffice, when brought into solution by the hot leaching water, to convert the cadmium oxid present into cadmium sulfate, which, being likewise soluble in the lixiviating agent will be removed from the ore.

In carrying out the leaching operation, it will be preferable to first run the hot leaching liquid into the leaching vat and to then admit the ore gradually, so that the anhydrous zinc sulfate shall go the more readily into solution. Otherwise, that is to say, if the ore were first formed into a bed in the leaching vat and the leaching liquid then poured upon it there would be a tendency for the anhydrous zinc sulfate, in combining with the water to crystallize in the mass of ore, and to act as a binding agent, thus interfering with the orderly and quantitative progress of the operation. The use of hot water is particularly to be recommended for the reason that zinc sulfate upon whose presence the conversion of the cadmium oxid depends is relatively highly soluble in water at high temperatures. If the amount of zinc sulfate present is insufficient to convert all of the cadmium oxid into cadmium sulfate, an amount of sulfuric acid or an amount of zinc sulfate may be added to the leaching water to make up for the deficiency, whether it be large or small. In operating upon natural oxidized ores, such as the carbonate or the silicate, the lixiviating water should contain a sufficient amount of sulfuric acid to bring about the desired reaction.

It will, of course, be understood that whatever portion of the cadmium of the roasted ore is already present therein as cadmium sulfate will require no conversion and will be leached out with the converted portion.

From the foregoing description, it will be noted that the object of the invention is to abstract the cadmium from a cadmium-bearing zinc ore. When the zinc ore is a sulfid it is roasted, under proper conditions, to leave in the ore a limited quantity of zinc sulfate, so that, upon lixiviation with water, the zinc sulfate will go into solution and convert the cadmium oxid present into cadmium sulfate which will thereupon enter into solution. Where the quantity of zinc sulfate in the roasted ore is too small, it may be supplemented by adding zinc sulfate or by adding sulfuric acid, as the case may be, to the lixiviating water. Where the ore treated is a natural oxidized ore, the necessary amount of zinc sulfate for effecting the conversion of the insoluble cadmium oxid into calcium sulfate may be produced as hereinbefore indicated, by adding a sufficient quantity of sulfuric acid to the lixiviating water.

What I claim is:

1. The method of removing cadmium from zinc ore, which consists in leaching the ore with water in the presence of a sufficient amount of zinc sulfate to convert the cadmium to be removed into soluble cadmium sulfate, and drawing off the resulting solution from the ore; substantially as described.

2. The method of removing cadmium from zinc ores, which consists in first roasting the ore, and lixiviating with water in the presence of zinc sulfate in amount sufficient to convert the cadmium to be removed into soluble cadmium sulfate, and drawing off the resulting solution from the ore; substantially as described.

3. The method of removing cadmium from zinc ores, which consists in first roasting the ore, and lixiviating with water in the presence of zinc sulfate in amount sufficient to convert the cadmium to be removed into soluble cadmium sulfate, the zinc sulfate present being derived in part from the roasted ore and in part from the addition of sulfuric acid to the lixiviating water, and drawing off the resulting solution from the ore; substantially as described.

4. The method of removing cadmium from zinc ore, which consists in leaching the ore with water in the presence of a sufficient amount of zinc sulfate to convert the cadmium to be removed into soluble cadmium sulfate, the leaching being effected by adding the ore gradually to a body of the leaching liquid, and drawing off the resulting solution from the ore; substantially as described.

In testimony whereof I affix my signature, in presence of two witnesses.

GILBERT RIGG.

Witnesses:
  C. F. BIERBAUER,
  E. G. TACY.